(12) United States Patent
Goto

(10) Patent No.: US 8,865,291 B2
(45) Date of Patent: Oct. 21, 2014

(54) PLASMA-RESISTANT MEMBER

(75) Inventor: Yoshinobu Goto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 343 days.

(21) Appl. No.: 13/469,219

(22) Filed: May 11, 2012

(65) Prior Publication Data
US 2012/0301679 A1 Nov. 29, 2012

Related U.S. Application Data

(60) Provisional application No. 61/489,813, filed on May 25, 2011.

(51) Int. Cl.
| B32B 3/00 | (2006.01) |
| B32B 9/00 | (2006.01) |
| B32B 19/00 | (2006.01) |
| C22C 29/16 | (2006.01) |
| C22C 29/06 | (2006.01) |
| C04B 41/87 | (2006.01) |
| C04B 41/50 | (2006.01) |
| C22C 29/12 | (2006.01) |
| C04B 41/00 | (2006.01) |

(52) U.S. Cl.
CPC ............. *C04B 41/5032* (2013.01); *C22C 29/16* (2013.01); *C22C 29/065* (2013.01); *C04B 41/87* (2013.01); *C22C 29/12* (2013.01); *C04B 41/009* (2013.01); *C04B 41/5045* (2013.01)

USPC ........... 428/172; 428/141; 428/156; 428/688; 428/689; 428/698; 428/699

(58) Field of Classification Search
USPC ......... 428/141, 142, 156, 167, 172, 408, 688, 428/689, 698, 699
See application file for complete search history.

(56) References Cited

U.S. PATENT DOCUMENTS 6,783,875 B2 * 8/2004 Yamada et al. ............... 428/697

FOREIGN PATENT DOCUMENTS

JP    2000-129388 A1    5/2000

* cited by examiner

*Primary Examiner* — Catherine A Simone
(74) *Attorney, Agent, or Firm* — Burr & Brown, PLLC

(57) ABSTRACT

A plasma-resistant member according to the present invention includes a base member formed of a silicon nitride sintered body, an aluminum nitride sintered body, an alumina sintered body, or a silicon carbide sintered body; and a thin film formed on a surface of the base member and composed of an yttrium compound or a spinel, wherein the thin film has, in a surface of the thin film, a plurality of projections for supporting a wafer, and a ratio a2/a1 of a film thickness a2 of portions of the thin film that include the projections to a film thickness a1 of portions of the thin film that do not include the projections satisfies 1<a2/a1<1.6.

4 Claims, 1 Drawing Sheet

[Partial sectional view of a plasma-resistant member]

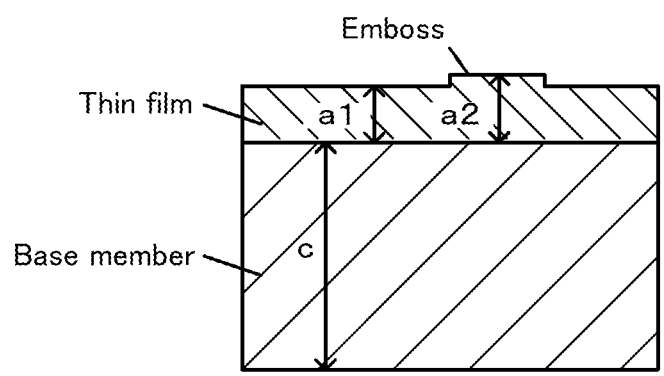
[Partial sectional view of a plasma-resistant member]

PLASMA-RESISTANT MEMBER

BACKGROUND OF THE INVENTION

1. Field of the Invention

The present invention relates to a plasma-resistant member.

2. Description of the Related Art

A plasma-resistant member is known in which an aluminum nitride sintered body is used as a base member and, in the base member, an yttria thin film is formed on a surface to be exposed to plasma (for example, Patent Literature 1).

CITATION LIST

Patent Literature

[PTL 1] Japanese Unexamined Patent Application Publication No. 2000-129388

SUMMARY OF THE INVENTION

However, when a base member formed of a silicon nitride sintered body, an aluminum nitride sintered body, an alumina sintered body, or a silicon carbide sintered body is used as a component member, a temperature increase to 700° C. sometimes causes cracks at the interface between the yttria thin film and the component member.

The present invention has been accomplished to solve such a problem. A main object of the present invention is to suppress occurrence of cracks at the interface between the thin film and the base member after a temperature increase to 700° C.

A plasma-resistant member of the present invention comprises: a base member formed of a silicon nitride sintered body, an aluminum nitride sintered body, an alumina sintered body, or a silicon carbide sinter; and a thin film formed on a surface of the base member and composed of an yttrium compound or a spinel,
wherein the thin film has, in a surface of the thin film, a plurality of projections for supporting a wafer, and a ratio $a2/a1$ of a film thickness $a2$ of portions of the thin film that include the projections to a film thickness $a1$ of portions of the thin film that do not include the projections satisfies $1<a2/a1<1.6$.

The present invention provides an advantage that cracks are not occurred at the interface between the thin film and the base member after a temperature increase to 700° C. In particular, when a ratio $a2/a1$ satisfies $1.17 \leq a2/a1 \leq 1.50$, this advantage can be provided with certainty.

BRIEF DESCRIPTION OF THE DRAWING

FIG. 1 is a partial sectional view of a plasma-resistant member.

DETAILED DESCRIPTION OF THE INVENTION

A plasma-resistant member according to the present invention includes a base member formed of a silicon nitride sinter, an aluminum nitride sinter, an alumina sinter, or a silicon carbide sinter; and a thin film formed on a surface of the base member and composed of an yttrium compound or a spinel, wherein the thin film has, in the surface of the thin film, a plurality of projections for supporting a wafer, and a ratio $a2/a1$ of a film thickness $a2$ of portions of the thin film that include the projections to a film thickness $a1$ of portions of the thin film that do not include the projections satisfies $1<a2/a1<1.6$.

In a plasma-resistant member according to the present invention, the ratio $a2/a1$ preferably satisfies $1.17 \leq a2/a1 \leq 1.50$.

In a plasma-resistant member according to the present invention, the yttrium compound is preferably yttria, YAG, YAM, or YAL. YAG denotes $Y_3Al_5O_{12}$ ($3Y_2O_3 \cdot 5Al_2O_3$) and has a garnet crystal structure. YAL denotes $YAlO_3$ ($Y_2O_3 \cdot Al_2O_3$) and has a perovskite crystal structure. YAM denotes $Y_4Al_2O_9$ ($2Y_2O_1 \cdot Al_2O_3$) and has a monoclinic system.

In a plasma-resistant member according to the present invention, the thin film is preferably formed on the surface of the base member by thermal spraying, ion plating, vapor deposition, a sol-gel process, or CVD.

In a plasma-resistant member according to the present invention, the projections preferably have a cylindrical shape.

In a plasma-resistant member according to the present invention, the thin film preferably has an average thickness of 5 to 100 μm and the average thickness is preferably less than 1% of the thickness of the base member. When a stepped structure is formed in a corner portion of the thin film, the ratio of the film thickness of a high portion of the stepped structure to the film thickness of a low portion of the stepped structure is preferably more than 1 and less than 1.6.

In a plasma-resistant member according to the present invention, the base member preferably has a thickness of 3 to 20 mm.

In the present invention, an environment in which the corrosion resistance is demanded is a halogen-gas atmosphere or a halogen-plasma-gas atmosphere.

EXAMPLES

Experimental Example 1

Plasma-resistant members of six types in which an yttria thin film was formed on a surface of a base member formed of an aluminum nitride sinter were produced in the following manner.

An aluminum nitride sinter having a diameter of 350 mm and an average thickness of 20 mm was first produced. Specifically, an yttria powder having an average particle size of 1.5 μm and a purity of 99.9% was added in an amount of 5% by weight to an aluminum nitride powder having an average particle size of 1 μm and a purity of 99.9%. These powders were mixed and the powder mixture was uniaxially press-formed at 100 kgf/cm². This formed body was sintered by a hot-press process. Thus, the aluminum nitride sintered body was obtained.

Yttria having a purity of 99.9% by weight was then thermally sprayed to the entire surface of the aluminum nitride sintered body. As a result, an aluminum nitride sintered body the entire surface of which was covered with the yttria thermal-spraying film was obtained.

Blasting through a mask was then performed to form embossed portions (diameter: 2.0 mm) for supporting a wafer. This blasting was performed with reference to Japanese Unexamined Patent Application Publication No. 4-304941.

In the above-described manner, the plasma-resistant members having Experiment Nos. 1-1 to 1-6 described in Table 1 were produced. A partial sectional view of such a plasma-resistant member obtained is illustrated in FIG. 1. Each of the plasma-resistant members was subjected to a temperature increase to 700° C. in the air and, after the temperature increase, it was inspected whether cracks were occurred at the interface between the aluminum nitride sintered body and the yttria thermal-spraying film or not. It was found that cracks were occurred in the members in which the ratio $a2/a1$ was 1.6 or more, whereas cracks were not occurred in the members in which the ratio was 1.5 or less. Experiment Nos. 1-3, 1-4, and 1-6 correspond to Examples of the present invention; and Experiment Nos. 1-1, 1-2, and 1-5 correspond to Comparative examples for the present invention.

The present application claims priority on the basis of the U.S. Provisional Patent Application No. 61/489,813 filed on May 25, 2011, the entire contents of which are incorporated herein by reference.

TABLE 1

| | Base member | | | Thin film (Thermal-spraying film) | | | | | | | |
|---|---|---|---|---|---|---|---|---|---|---|---|
| | Material | $\alpha 1$ (ppm) | Average thickness c (mm) | Material | $\alpha 2$ (ppm) | Average thickness a (µm) | Film thickness a1 of portion not including emboss (µm) | Film thickness a2 of portion including emboss (µm) | Ratio a2/a1 | Height of emboss a2 – a1 (µm) | Crack |
| Experiment example 1-1 | AlN | 5 | 20 | $Y_2O_3$ | 8 | 50 | 50 | 90 | 1.80 | 40 | Occurred |
| Experiment example 1-2 | AlN | 5 | 20 | $Y_2O_3$ | 8 | 50 | 50 | 80 | 1.60 | 30 | Occurred |
| Experiment example 1-3 | AlN | 5 | 20 | $Y_2O_3$ | 8 | 50 | 50 | 70 | 1.40 | 20 | Not occurred |
| Experiment example 1-4 | AlN | 5 | 20 | $Y_2O_3$ | 8 | 50 | 50 | 60 | 1.20 | 10 | Not occurred |
| Experiment example 1-5 | AlN | 5 | 20 | $Y_2O_3$ | 8 | 100 | 100 | 180 | 1.80 | 80 | Occurred |
| Experiment example 1-6 | AlN | 5 | 20 | $Y_2O_3$ | 8 | 100 | 100 | 150 | 1.50 | 50 | Not occurred |

$\alpha 1$: Coefficient of linear thermal expansion of AlN,
$\alpha 2$: Coefficient of linear thermal expansion of $Y_2O_3$ Experimental Example 2

Plasma-resistant members of four types in which a YAG thin film was formed on a surface of a base member formed of a silicon nitride sintered body were produced (diameter of embossed portions: 2.0 mm). Table 2 describes details of the plasma-resistant members having Experiment Nos. 2-1 to 2-4. Each of the plasma-resistant members was subjected to a temperature increase to 700° C. in the air and, after the temperature increase, it was inspected whether cracks were occurred at the interface between the silicon nitride sintered body and the YAG thin film or not. It was found that cracks were occurred in the members in which the ratio a2/a1 was 1.6 or more, whereas cracks were not occurred in the members in which the ratio was 1.5 or less. Experiment Nos. 2-3 and 2-4 correspond to Examples of the present invention; and Experiment Nos. 2-1 and 2-2 correspond to Comparative examples for the present invention.

What is claimed is:

1. A plasma-resistant member comprising: a base member formed of a silicon nitride sintered body, an aluminum nitride sintered body, an alumina sintered body, or a silicon carbide sintered body; and a thin film formed on a surface of the base member and composed of an yttrium compound or a spinel,
   wherein the thin film has, in a surface of the thin film, a plurality of projections for supporting a wafer, and
   a ratio a2/a1 of a film thickness a2 of portions of the thin film that include the projections to a film thickness a1 of portions of the thin film that do not include the projections satisfies 1<a2/a1<1.6.

2. The plasma-resistant member according to claim 1, wherein the ratio a2/a1 satisfies 1.17 a2/a1<1.50.

3. The plasma-resistant member according to claim 1, wherein the yttrium compound is yttria, YAG, YAM, or YAL.

4. The plasma-resistant member according to claim 1,

TABLE 2

| | Base member | | | Thin film (Thermal-spraying film) | | | | | | | |
|---|---|---|---|---|---|---|---|---|---|---|---|
| | Material | $\alpha 1$ (ppm) | Average thickness c (mm) | Material | $\alpha 2$ (ppm) | Average thickness a (µm) | Film thickness a1 of portion not including emboss (µm) | Film thickness a2 of portion including emboss (µm) | Ratio a2/a1 | Height of emboss a2 – a1 (µm) | occurrence of crack |
| Experiment example 2-1 | $Si_3N_4$ | 4 | 20 | YAG | 8 | 60 | 60 | 120 | 2.00 | 60 | Occurred |
| Experiment example 2-2 | $Si_3N_4$ | 4 | 20 | YAG | 8 | 60 | 60 | 100 | 1.67 | 40 | Occurred |
| Experiment example 2-3 | $Si_3N_4$ | 4 | 20 | YAG | 8 | 60 | 60 | 90 | 1.50 | 30 | Not occurred |
| Experiment example 2-4 | $Si_3N_4$ | 4 | 20 | YAG | 8 | 60 | 60 | 70 | 1.17 | 10 | Not occurred |

$\alpha 1$: Coefficient of linear thermal expansion of $Si_3N_4$,
$\alpha 2$: Coefficient of linear thermal expansion of YAG wherein the thin film is formed on the surface of the base member by thermal spraying, ion plating, vapor deposition, a sol-gel process, or CVD.

* * * * *